United States Patent
Matsuzaki

(10) Patent No.: US 8,386,938 B2
(45) Date of Patent: Feb. 26, 2013

(54) DISPLAY CONTROL DEVICE, METHOD, AND PROGRAM

(75) Inventor: Katsuro Matsuzaki, Kanagawa (JP)

(73) Assignee: Sony Corporation (JP)

( * ) Notice: Subject to any disclaimer, the term of this patent is extended or adjusted under 35 U.S.C. 154(b) by 959 days.

(21) Appl. No.: 12/012,226

(22) Filed: Jan. 31, 2008

(65) Prior Publication Data

US 2008/0229209 A1    Sep. 18, 2008

(30) Foreign Application Priority Data

Feb. 1, 2007    (JP) ................ P2007-023348

(51) Int. Cl.
*G06F 3/00*    (2006.01)
(52) U.S. Cl. ................ 715/740; 715/738; 707/822
(58) Field of Classification Search ............. 715/740, 715/738; 707/822
See application file for complete search history.

(56) References Cited

U.S. PATENT DOCUMENTS

| | | | | |
|---|---|---|---|---|
| 5,517,605 | A * | 5/1996 | Wolf ............................ | 1/1 |
| 5,765,171 | A * | 6/1998 | Gehani et al. ................ | 1/1 |
| 6,263,121 | B1 * | 7/2001 | Melen et al. ................ | 382/305 |
| 6,477,649 | B2 * | 11/2002 | Kambayashi et al. ........ | 726/27 |
| 6,493,720 | B1 * | 12/2002 | Chu et al. .................... | 1/1 |
| 6,611,828 | B1 * | 8/2003 | Koleszar et al. ............. | 702/20 |
| 6,691,282 | B1 * | 2/2004 | Rochford et al. ............ | 715/234 |
| 6,844,886 | B1 * | 1/2005 | Yanagawa et al. ........... | 715/744 |
| 6,970,127 | B2 * | 11/2005 | Rakib ........................... | 341/173 |
| 7,007,022 | B2 * | 2/2006 | Ban .............................. | 1/1 |
| 7,601,905 | B2 * | 10/2009 | Yanase et al. ................ | 84/600 |
| 7,953,748 | B2 * | 5/2011 | Tanaka et al. ................ | 707/769 |
| 2002/0154144 | A1 * | 10/2002 | Lofgren et al. ............... | 345/634 |
| 2004/0117309 | A1 * | 6/2004 | Inoue et al. .................. | 705/50 |
| 2005/0010562 | A1 * | 1/2005 | Nagasaka ..................... | 707/3 |
| 2006/0059200 | A1 * | 3/2006 | Sakai et al. .................. | 707/104.1 |
| 2006/0195553 | A1 | 8/2006 | Nakamura | |
| 2006/0259501 | A1 * | 11/2006 | Suzuki ......................... | 707/100 |
| 2007/0055677 | A1 * | 3/2007 | Uchida ......................... | 707/100 |
| 2007/0076251 | A1 * | 4/2007 | Yasuda ......................... | 358/1.15 |

FOREIGN PATENT DOCUMENTS

| | | |
|---|---|---|
| JP | 2006-227843 A | 8/2006 |
| JP | 2006-313502 A | 11/2006 |

* cited by examiner

*Primary Examiner* — Phenuel Salomon
(74) *Attorney, Agent, or Firm* — Lerner, David, Littenberg, Krumholz & Mentlik, LLP

(57) ABSTRACT

A display control device that may control, in response to user's operation, a list display of a file of contents accumulated in another device connected over a network, and a list display of a folder in a hierarchy for storing the file. The device may include type selection means for selecting a type for the file in accordance with the user's operation; reception control unit for controlling reception of file attribute information coming from the another device about an attribute provided to the folder indicating the type of the file stored in the folder; attribute determination unit for determining, based on the file attribute information, whether the folder is provided with the attribute of the selected type; and display controller for controlling, when the folder is determined as not being provided with the attribute of the selected type, the list display to constrain a display of the folder.

12 Claims, 13 Drawing Sheets

DISPLAY CONTROL DEVICE, METHOD, AND PROGRAM

CROSS-REFERENCE TO RELATED APPLICATIONS

This application claims priority from Japanese Patent Application No. JP 2007-023348 filed in the Japanese Patent Office on Feb. 1, 2007, the entire content of which is incorporated herein by reference.

BACKGROUND OF THE INVENTION

1. Field of the Invention

The present invention relates to a display control device, method, and program and, more specifically, to a display control device, method, and program with which ease of use can be increased.

2. Description of Related Art

The technology designed for a network of a television receiver has recently become popular finally, and thus there is not yet any advanced technology for GUI (Graphical User Interface) and for ease of use with other devices connected over the network.

The network server is generally made ready specifically for the use or is a personal computer. The personal computer is equipped with a high-performance user interface such as high-resolution monitor, keyboard, and mouse. In the personal computer, the operation of such a user interface is defined as so-called "drag and drop" and "shift click", for example, and a large number of files and folders can be operated with ease simultaneously and selectively, can be searched with ease using a keyboard, and others.

Moreover, the number of files, e.g., files of still images, moving images, or audio, is ever growing for storage into devices such as servers. This is resulted from the recent capacity increase of recording media such as hard disk, the widespread use of digital still cameras and portable audio devices, and others.

The applicant of the invention has proposed a meta information server that acquires contents meta information from a device connected over a network, and forwards the acquired meta information to a remote controller. For more details, refer to Patent Document 1 (JP-A-2006-227843).

SUMMARY OF THE INVENTION

A television receiver is being advanced in functionality, e.g., digitization of broadcasting, increase of definition, and capability for the Internet. The user interface is a remote controller that is basically expected to be used by one hand for device operation, and any corresponding response is displayed on the screen. This enables anyone to operate the user interface but ease of use thereof is restricted. There is a problem that, especially, the ease of use with respect to a large number of contents is poor compared with that of a personal computer.

With the technology of Patent Document 1, the meta information server collectively manages meta information of contents accumulated in any devices connected over a network so that the contents available on the network can be kept track in the form of a list. When there are a large number of contents on the network, however, there is a possible difficulty in finding and reproducing any desired contents out of the contents. As such, the technology of Patent Document 1 has the problem of a difficulty in going through an operation of reproducing any desired contents with ease using a remote controller.

It may thus be desirable to increase ease of use by changing information displayed on a screen with no change to a remote controller for operating a television receiver.

According to a first embodiment of the present invention, there is provided a display control device that may control, in response to user's operation to a remote controller, a list display of a file of contents accumulated in another device connected over a network, and a list display of a folder in a hierarchy for storing the file. The display control device may include type selection means for selecting a type for the file in accordance with the user's operation to the remote controller; reception control means for controlling reception of file attribute information coming from the other device about an attribute provided to the folder indicating the type of the file stored in the folder; attribute determination means for determining, based on the file attribute information, whether the folder is provided with the attribute of the selected type; and display control means for controlling, when the folder is determined as not being provided with the attribute of the selected type, the list display to constrain a display of the folder.

The network may denote a mechanism in which at least two devices are connected to each other for information transmission from one to the other. The devices communicating over the network may be those provided separately or may be internal blocks configuring a piece of device.

The expression of "communications" may surely include communications both by cable and by radio, i.e., communications by radio for a section, and communications by cable for another section. The expression of "communications" may also include communications by cable in a direction from one device to the other, and communications by radio in a direction opposite thereto.

The attribute determination means may determine whether the type of the file is the same as the selected type, and the display control means may control, when the type of the file is determined as not being the same as the selected type, the list display to constrain a display of the file.

The attribute determination means may determine whether the other device is recorded with a file of a type same as the selected type, and when the other device is determined as not being recorded with the file of the type same as the selected type, the display control means may control a list display of devices to constrain a display of the another device.

The contents may be a file of a still image, a moving image, or audio.

The other device may be compatible to specifications of DLNA.

According to a second embodiment of the present invention, there is provided a display control method for a display control device that may control, in response to user's operation to a remote controller, a list display of a file of contents accumulated in another device connected over a network, and a list display of a folder in a hierarchy for storing the file. The display control method may include selecting a type for the file in accordance with the user's operation to the remote controller; controlling reception of file attribute information coming from the other device about an attribute provided to the folder indicating the type of the file; determining, based on the file attribute information, whether the folder is provided with the attribute of the selected type; and controlling, when the folder is determined as not being provided with the attribute of the selected type, the list display to constrain a display of the folder.

According to a third embodiment of the present invention, there is provided a program which may allow a computer to execute a process of controlling, in response to user's operation to a remote controller, a list display of a file of contents accumulated in another device connected over a network, and a list display of a folder in a hierarchy for storing the file. The display control process may include selecting a type for the file in accordance with the user's operation to the remote controller; controlling reception of file attribute information coming from the other device about an attribute provided to the folder indicating the type of the file; determining, based on the file attribute information, whether the folder is provided with the attribute of the selected type; and controlling, when the folder is determined as not being provided with the attribute of the selected type, the list display to constrain a display of the folder.

In the embodiments of the invention, the type of a file may be selected in response to user's operation to a remote controller, and reception may be controlled for file attribute information coming from the other device about an attribute provided to the folder indicating the type of the file stored in the folder. Based on the file attribute information, a determination may be made whether the folder is provided with the attribute of the selected type. When the folder is determined as not being provided with the attribute of the selected type, the display of a list may be controlled not to display the folder.

As described above, in the embodiments of the invention, ease of use can be increased.

DETAILED DESCRIPTION

Figure 1:
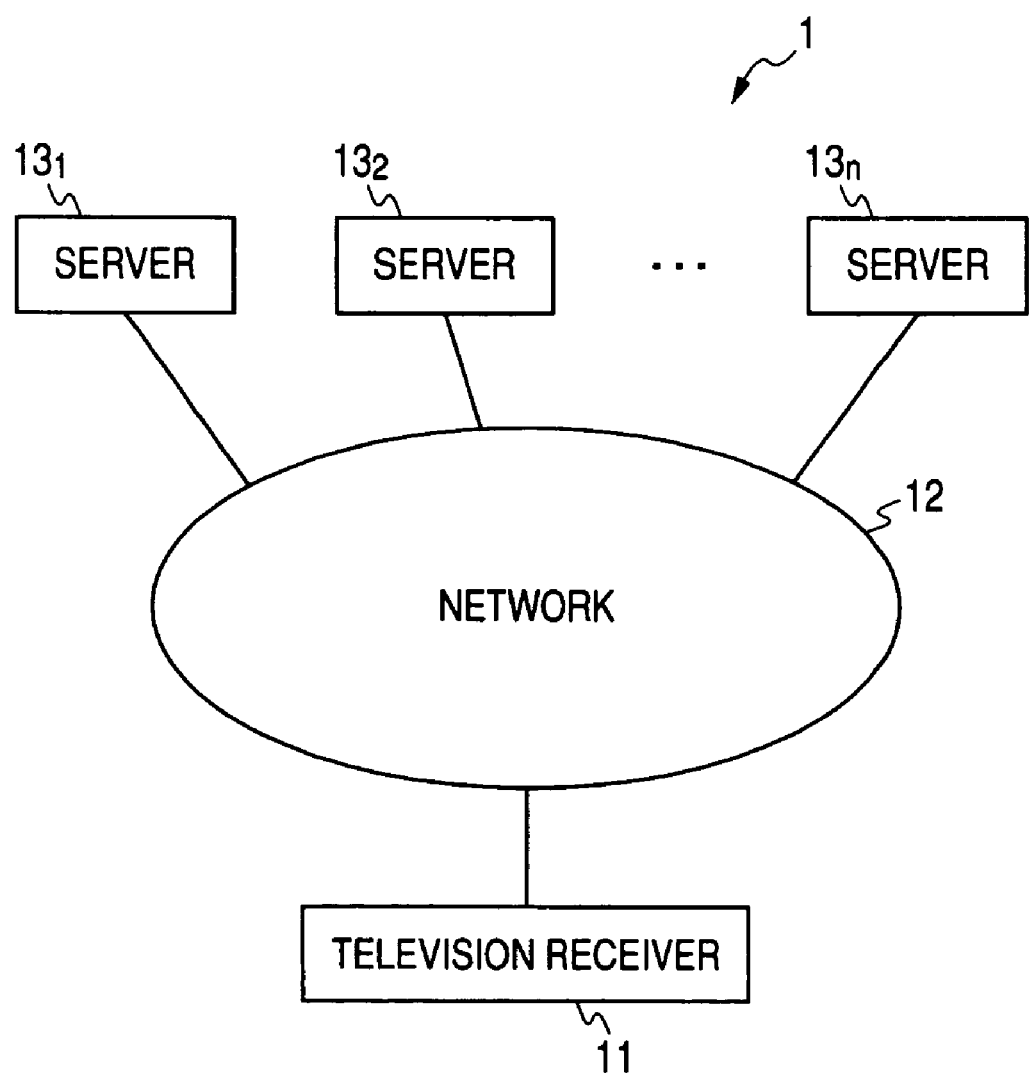
FIG. 1 is a block diagram showing the configuration of a network system in an embodiment to which the invention is applied.

Prior to describing embodiments of the invention below, exemplified is a correlation among claimed components and embodiments in this specification or in the accompanying drawings. This is aimed to prove that an embodiment provided for the purpose of supporting the description of claims is described in the specification or in the accompanying drawings. Therefore, even if there is any specific embodiment found in the specification or in the accompanying drawings but not found here for the components described in the an embodiment of the invention, it does not mean that the embodiment is not correlated with the components. On the other hand, even if there is any specific embodiment found here for the components, it does not mean that the embodiment is only correlated with the components.

An embodiment of the invention is directed to a display control device (e.g., television receiver 11 of FIG. 3) that controls, in response to user's operation to a remote controller (e.g., remote controller 14 of FIG. 3), a list display of a file of contents accumulated in another device (e.g., servers $13_1$ to $13_n$ of FIG. 1) connected over a network (e.g., network 12 of FIG. 1), and a list display of a folder in a hierarchy for storing the file. The display control device includes: type selection means (e.g., type selection section 61 of FIG. 3) for selecting a type for the file (e.g., type such as still image, moving image, and audio) in accordance with the user's operation to the remote controller; reception control means (e.g., reception control section 62 of FIG. 3) for controlling reception of file attribute information coming from the other device about an attribute provided to the folder indicating the type of the file stored in the folder; attribute determination means (e.g., attribute determination section 63 of FIG. 3) for determining, based on the file attribute information, whether the folder is provided with the attribute of the selected type; and display control means (e.g., display control section 64 of FIG. 3) for controlling, when the folder is determined as not being provided with the attribute of the selected type, the list display to constrain a display of the folder.

Figure 10:
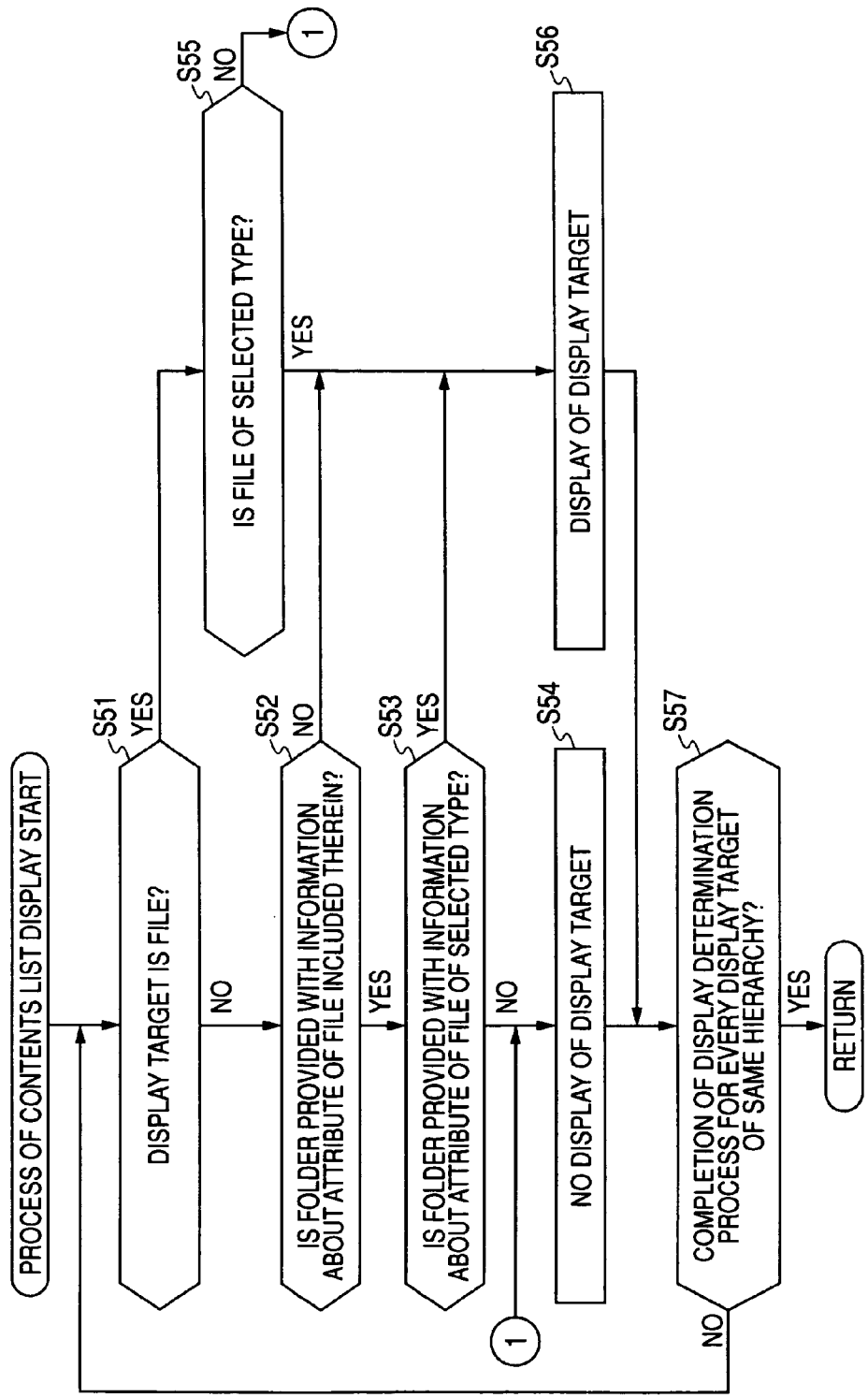
FIG. 10 is a flowchart for illustrating in detail a process of contents list display.

The attribute determination means can determine whether the type of the file is the same as the selected type (e.g., process of step S55 of FIG. 10), and the display control means can control, when the type of the file is determined as not being the same as the selected type, the list display to constrain a display of the file (e.g., process of S54 of FIG. 10).

Figure 8:
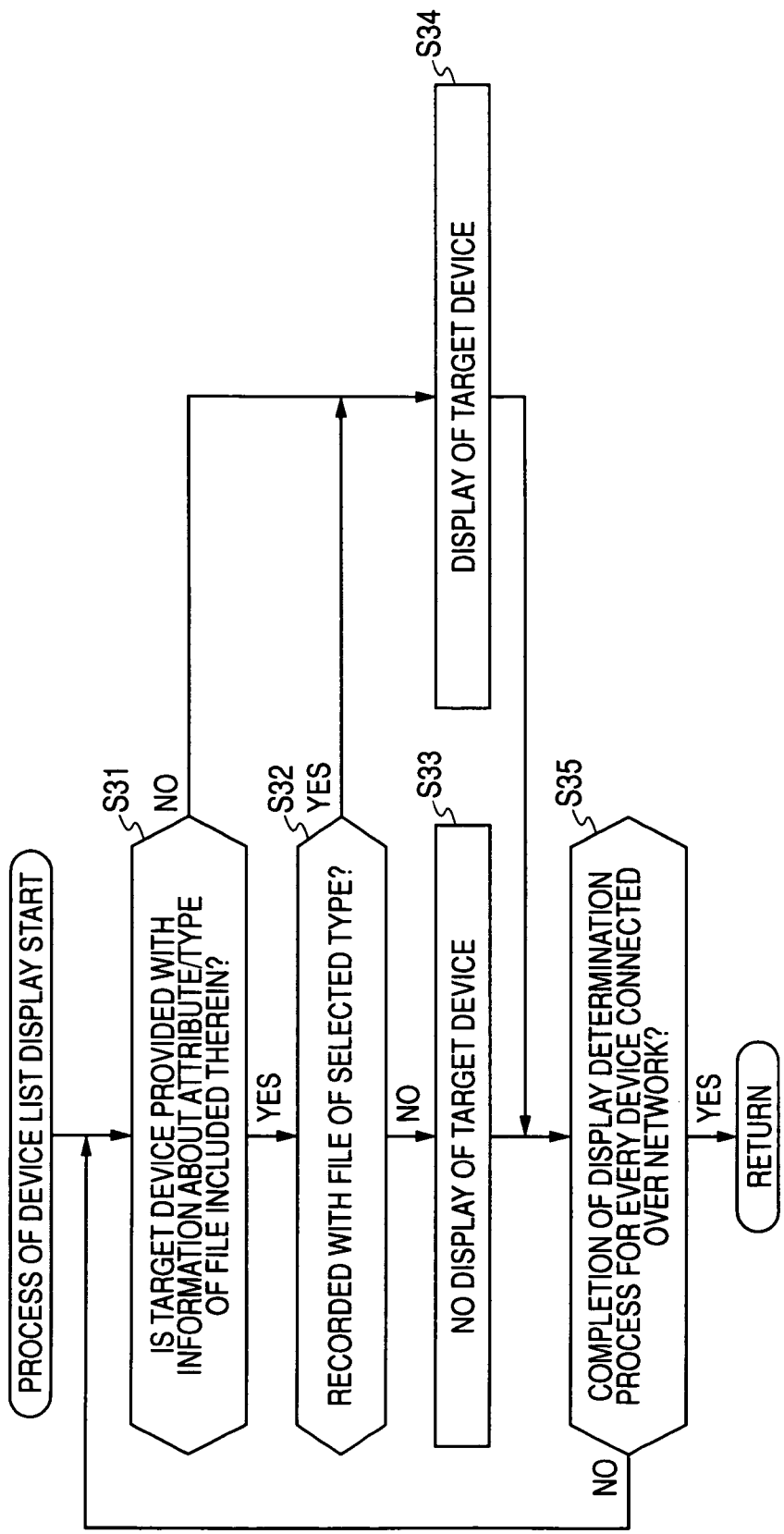
FIG. 8 is a flowchart for illustrating in detail a process of device list display.

The attribute determination means can determine whether the other device is recorded with a file of a type same as the selected type (e.g., process of step S32 of FIG. 8), and when the other device is determined as not being recorded with the file of the type same as the selected type, the display control means can control the list display to constrain a display in the other device (e.g., process of step S33 of FIG. 8).

Another embodiment of the invention is directed to a display control method for a display control device that controls, in response to user's operation to a remote controller, a list display of a file of contents accumulated in another device connected over a network, and a list display of a folder in a hierarchy for storing the file, including the steps of, and a program allowing a computer to execute the steps of: selecting a type for the file in accordance with the user's operation to the remote controller (e.g., process of step S12 of FIG. 6); controlling reception of file attribute information coming from the other device about an attribute provided to the folder indicating the type of the file (e.g., process of step S13 of FIG. 6); determining, based on the file attribute information, whether the folder is provided with the attribute of the selected type (e.g., process of step S53 of FIG. 10); and controlling, when the folder is determined as not being provided with the attribute of the selected type, the list display to constrain a display of the folder (e.g., process of step S54 of FIG. 10).

Figure 2:
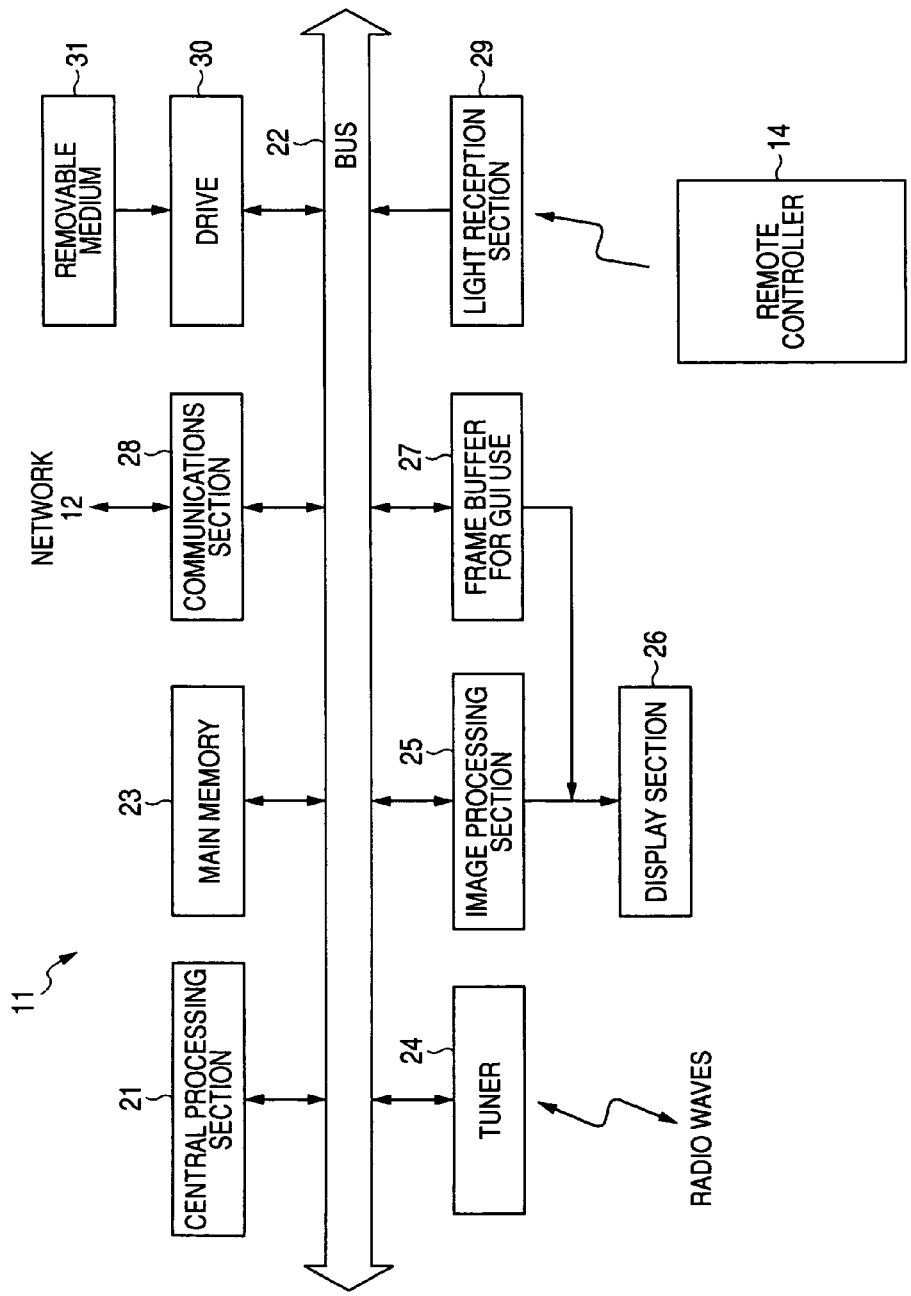
FIG. 2 is a block diagram showing the configuration of a television receiver.

A program of one embodiment of the invention can be recorded into a recording medium (e.g., removable medium 31 of FIG. 2).

In the below, an embodiment of the invention is described by referring to the accompanying drawings.

FIG. 1 is a block diagram showing the configuration of a network system 1 in an embodiment to which the invention is applied. In this network system 1, a network 12 is connected with a television receiver 11 and servers $13_1$ to $13_n$ (where n is a natural number).

The television receiver 11 is a so-called low-profile television receiver equipped with a display device such as LCD (Liquid Crystal Display) and PDP (Plasma Display Panel). The television receiver 11 displays images on its screen based on signals coming from an antenna for reception of digital broadcasting, e.g., digital terrestrial broadcasting and BS (Broadcasting Satellite) ICS (Communication Satellite) digital broadcasting, and from an antenna for reception of analog terrestrial broadcasting.

The television receiver 11 forwards a request to the servers $13_1$ to $13_n$ over the network 12. The request is the one issued for acquiring contents accumulated in the servers $13_1$ to $13_n$, and such a request is hereinafter referred to as contents request. In response to such a contents request, the television receiver 11 receives any contents or information about the contents coming from the servers $13_1$ to $13_n$. Such information about the contents is hereinafter referred to as contents information. The television receiver 11 reproduces thus received contents.

The contents include files of still images, moving images, or audio, for example. The contents information is exemplified by directory structure information, which indicates the directory structure of files of contents stored in devices such as the servers $13_1$ to $13_n$, and folders storing the files.

The network 12 is exemplified by wireless LAN (Local Area Network) being in conformity with standards such as IEEE (Institute of Electrical and Electronics Engineers) 802.11a, 802.11b, or 802.11g, wired LAN being in conformity with standards such as Ethernet (trade mark), the Internet, and others, all of which are established inside of buildings.

The network 12 forwards a contents request coming from the television receiver 11 to the servers $13_1$ to $13_n$. The network 12 forwards, to the television receiver 11, any contents or contents information coming from the server $13_1$ to $13_n$.

The server $13_1$ is exemplified by a device such as server, personal computer, or hard disk recorder specifically provided to be ready for specifications such as DLNA (Digital Living Network Alliance), and is disposed inside of a house for use to accumulate contents therein.

The server $13_1$ provides any contents or contents information stored therein to the television receiver 11 over the network 12. This provision is made in response to a contents request coming from the television receiver 11.

The contents are accumulated in the server $13_1$ as files of still images, moving images, or audio, for example. In the server $13_1$, these files are stored hierarchically together with folder storing the files.

Similarly to the server $13_1$, the servers $13_2$ to $13_n$ are each exemplified by a server specifically provided for the use, and provide any contents or contents information stored therein over the network 12 in response to a contents request coming from the television receiver 11.

In the network system 1 in FIG. 1 example, the television receiver 11 is solely provided, but alternatively, the television receiver may be provided plurally. In the below, when there is no need to make a distinction among the servers $13_1$ to $13_n$, the servers are simply referred as server 13.

FIG. 2 is a block diagram showing the configuration of the television receiver 11.

The television receiver 11 is configured to include a central processing section 21, a main memory 23, a tuner 24, an image processing section 25, a display section 26, a frame buffer 27 for GUI (Graphical User Interface) use, a communications section 28, and a light reception section 29. These components, i.e., the central processing section 21, the main memory 23, the tuner 24, the image processing section 25, the GUI-use frame buffer 27, the communications section 28, and the light reception section 29, are connected to one another via a bus 22.

The central processing section 21 is exemplified by a CPU (Central Processing Unit), and controls the operation of the components in the television receiver 11.

The central processing section 21 stores an application program into the main memory 23, and runs the application program. Whenever required, the central processing section 21 also makes a supply of data to the main memory 23, and acquires data temporarily stored in the main memory 23.

The tuner 24 demodulates a broadcast signal of radio waves received by an antenna (not shown), and acquires a video signal and an audio signal. This signal demodulation is performed in accordance with a user-made designation of a receiving broadcast station. The tuner 24 then forwards thus acquired video signal to the image processing section 25, and forwards the audio signal to an audio processing section (not shown). Note here that the broadcast signal being the demodulation result generally includes not only a video signal but also an audio signal and others. In this example, for the sake of simplicity, a description is given about a video signal.

The image processing section 25 applies a decoding process to the video signal provided by the tuner 24. Thereafter, to the result of the decoding process, i.e., video data, the image processing section 25 applies a predetermined process such as noise elimination, and the resulting video data is forwarded to the display section 26.

The display section 26 is exemplified by an LCD or a PDP, and displays thereon videos of a program corresponding to the video data provided by the image processing section 25, for example.

The central processing section 21 generates information about GUI for display on the display section 26, e.g., icons varying in type, and such information is hereinafter referred to as GUI information. The resulting GUI information is supplied to the GUI-use frame buffer 27. As a result, the video data coming from the image processing section 25 and the GUI information coming from the GUI-use frame buffer 27 are overlaid one on the other, and the overlay result is displayed on the display section 26.

The communications section 28 is configured by a wireless LAN interface being in conformity with the standards of IEEE802.11, or a wired LAN interface being in conformity with the standards such as Ethernet (trade mark). The communications section 28 communicates with other devices connected over the network 12, e.g., the servers $13_1$ to $13_n$, wirelessly or over a cable.

A remote controller 14 generates an operation command for use to control the television receiver 11 in response to user's operation. Thus generated operation command is forwarded to the television receiver 11.

From the remote controller 14, the light reception section 29 receives infrared rays being in conformity with any predetermined format such as SIRCS (Serial Infrared Remote Control System) or others. The light reception section 29 then supplies, to the central processing section 21, an operation command being a demodulation result of the infrared rays and indicating the details of the user's operation.

The central processing section 21 executes various types of processes in accordance with the operation command coming from the light reception section 29.

A drive 30 connected to the bus 22 drives any attached removable medium 31, e.g., magnetic disk, optical disk, magneto-optical disk, or semiconductor memory, and acquires programs and data recorded in the removable medium 31. Thus acquired programs and data are transferred to the main memory 23 or others, as required, for storage.

The application program for execution by the central processing section 21 may be stored in advance in the television receiver 11 through installation. Alternatively, the application program may be recorded in the removable medium 31, and the removable medium 31 may be provided to a user as a package medium so that the program can be installed to the television receiver 11 from the removable medium 31. Still alternatively, the application program for execution by the central processing section 21 may be supplied to the television receiver 11 through direct downloading from any download site to the television receiver 11 or through downloading using a personal computer that is not shown so that the program can be supplied and installed to the television receiver 11.

Exemplified in the embodiment is the case where the television receiver 11 is provided with the display section 26. As an alternative configuration with no provision of the display section 26, the television receiver 11 may function as a display control device that displays videos on any external display device. If this is the configuration, the television receiver 11 is connected with any other television receivers, thereby controlling any display of data such as contents to the other television receivers.

The audio signal output by the tuner 24 is subjected to a decoding process by an audio processing section (not shown), for example. The resulting audio data is output from a speaker (not shown).

Figure 3:
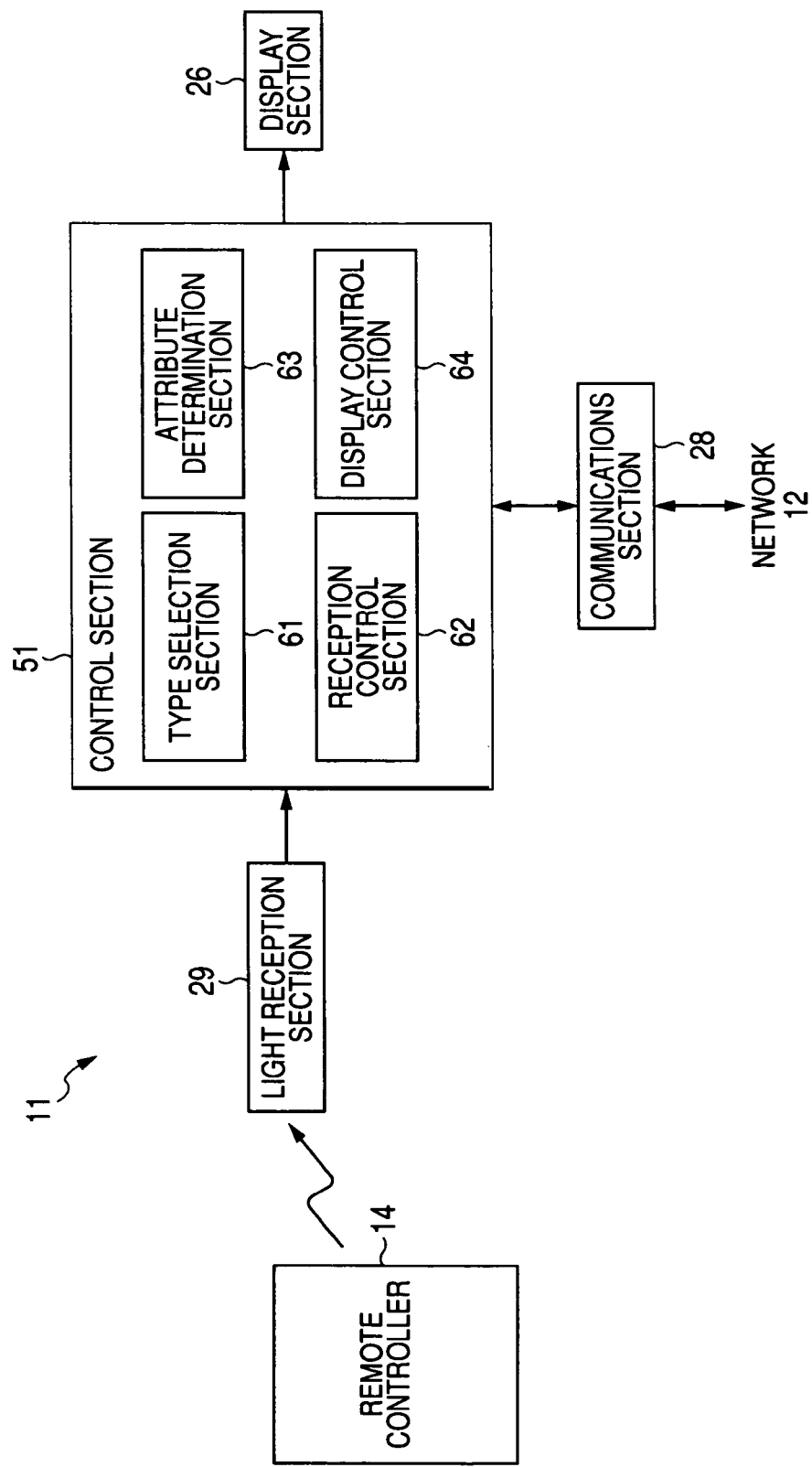
FIG. 3 is a block diagram showing the configuration of function blocks in the television receiver.

The hardware configuration of the television receiver 11 is not restrictive to that of FIG. 2 example, and may at least include the functional configuration of FIG. 3.

FIG. 3 is a block diagram showing the functional configuration of the television receiver 11.

Note that, in FIG. 3, any components similar to those in FIG. 2 are provided with the same reference numerals, and any components designed for similar processing are not described twice.

A control section 51 is configured to include a type selection section 61, a reception control section 62, an attribute determination section 63, and a display control section 64.

The type selection section 61 selects the type of a file for contents such as still images, moving images, audio, or others in response to user's operation to the remote controller 14. The type selection section 61 supplies information about the selected type to the attribute determination section 63. Such information is hereinafter referred to as type information.

The reception control section 62 controls the communications section 28 to make it receive various types of data coming from any devices connected over the network 12. The various types of data include contents, contents information, and others. For example, the reception control section 62 controls the communications section 28 to make it receive directory structure information coming from the server 13 over the network 12. The reception control section 62 supplies the received directory structure information to the attribute determination section 63.

Although the details are left for later description by referring to FIG. 5, the directory structure information is a part of the contents information, and is about the hierarchical structure of files of contents and folders storing the files. The files of the contents here are those recorded in the server 13 connected over the network 12. The directory structure information is written with attributes about the files stored on a folder basis, and such information is hereinafter referred to as file attribute information.

That is, the folders are each provided with file attribute information corresponding to a file(s) stored therein, e.g., file(s) of still images, moving images, or audio. To be specific, a folder storing therein a file of still images is provided with file attribute information of "p", a folder storing therein a file of moving images is provided with file attribute information of "v", and a folder storing therein a file of audio is provided with file attribute information of "m". In other words, the file attribute information is a flag to be provided depending on the type of a file(s) stored in any of folders of "p", "v", and "m", for example.

Not only to the folders, such file attribute information is provided also to devices connected over the network 12, e.g., the server 13. To be specific, a device for recording a file of still images is provided with file attribute information of "p", a device for recording a file of moving images is provided with file attribute information of "v", and a device for recoding a file of audio is provided with file attribute information of "m", for example. The file attribute information provided to every device is written to the directory structure information, for example.

In other words, the file attribute information is about the attribute of files stored in folders, and is about the attribute/type of files provided by devices such as the server 13.

Note here that the file attribute information for provision to the folders is not necessarily provided to every folder, and it is arbitrary whether the file attribute information is included in folders. Similarly to the relationship between the file attribute information and the folders, it is also arbitrary whether the file attribute information is included in devices.

The attribute determination section 63 is provided with type information about the user-selected type from the type selection section 61, and the directory structure information from the reception control section 62. Based on the type information and the directory structure information, the attribute determination section 63 then determines whether the file attribute information of the user-selected type is correctly provided to the corresponding folder. The attribute determination section 63 supplies the determination result to the display control section 64.

Also based on the type information and the directory structure information, the attribute determination section 63 determines whether the type of the file(s) stored in the server 13 is the same as the user-selected type. The attribute determination section 63 supplies the determination result to the display control section 64.

Also based on the type information and the directory structure information, the attribute determination section 63 determines whether any file of the type same as the user-selected type is stored in the server 13 connected over the network 12. The attribute determination section 63 supplies the determination result to the display control section 64.

Based on the determination result provided by the attribute determination section 63, the display control section 64 controls the display section 26 in terms of screen display.

Figure 4:
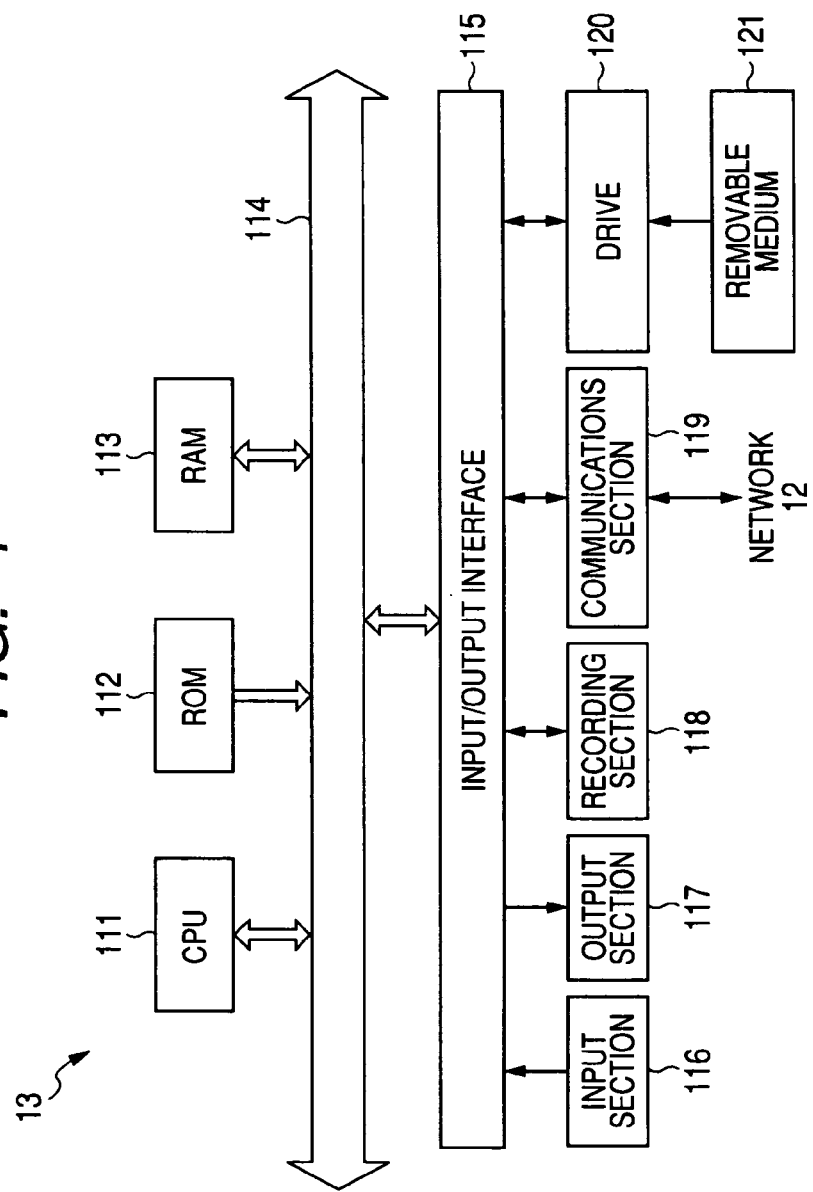
FIG. 4 is a block diagram showing the configuration of a server.

FIG. 4 is a block diagram showing the configuration of the server 13.

In the server 13 of FIG. 4 example, a CPU 111 executes various types of processes in accordance with a program stored in a ROM (Read Only Memory) 112, or a program loaded into a RAM (Random Access Memory) 113 from the recording section 118. The RAM 113 is also stored with any data needed for the CPU 111 to execute the processes as appropriate.

The components, i.e., the CPU 111, the ROM 112, and the RAM 113, are connected to one another via a bus 114. This bus 114 is also connected with an input/output interface 115.

The input/output interface 115 is connected with an input section 116, an output section 117, a recording section 118, and a communications section 119. The input section 116 is exemplified by a keyboard, a mouse, and others, and the output section 117 is exemplified by a speaker, a display, and others. The recording section 118 is configured by a hard disk, for example. The communications section 119 takes charge of controlling a communications process with other devices, e.g., the television receiver 11, over the network 12.

The input/output interface 115 is also connected with a drive 120 if required, and thereto, any removable medium 121 such as magnetic disk, optical disk, magneto-optical disk, or semiconductor memory is attached as appropriate. A computer program read from such a removable medium 121 is installed to the recording section 118 as required.

As described above, contents such as files of still images, moving images, audio, and others are stored in the server 13. These contents are recorded in the recording section 18, for example. The contents information such as directory structure information is recorded in the recording section 118 as are the contents, for example.

Figure 5:
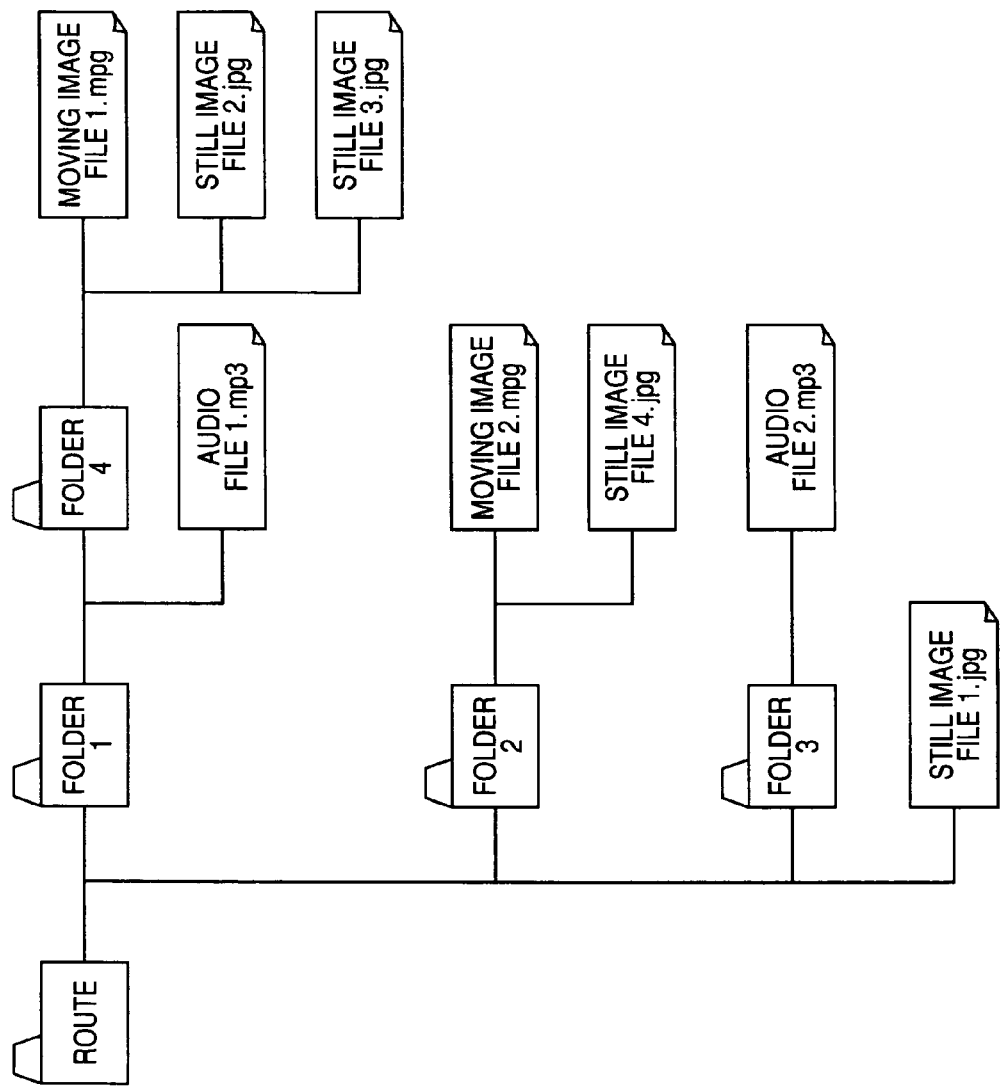
FIG. 5 is a diagram showing exemplary directory structure information of contents.

FIG. 5 is a diagram showing an example of the directory structure information recorded in the recording section 118 of the server 13.

Note that, in the below, for convenience of description, the directory structure information of FIG. 5 example is assuming as about contents recorded in the recording section 118 of the server $13_1$ among the severs $13_1$ to $13_n$ connected to the network 12.

In the directory structure information of FIG. 5 example, data represented by folder-shaped graphics such as "folder 1" and "folder 2" each denote a folder. The text assigned to each of the folder-shaped graphics denotes the folder name of the folder.

Moreover, data represented by file-shaped graphics such as "still image file 1. jpg" and "still image file 2. jpg" each denote a file. The text assigned to each of the file-shaped graphics denotes the file name of the file.

Also in the example of the directory structure information of FIG. 5, in the file name, the portion on the right end side segmented by a period (.) denotes a file extension. That is, taking the "still image file 1. jpg", as an example, the file extension is "jpg", and thus it is known as being contents of images compressed by JPEG (Joint Photographic Experts Group). Similarly, the file with a file extension of "mpg" is contents of moving images compressed by MPEG (Moving Picture Experts Group), and the file with a file extension of "mp3" is contents of audio compressed by mp3 (MPEG Audio Layer-3).

Herein, the file extensions of "jpg", "mpg", and "mp3" are examples of files of still images, moving images, and audio, respectively, and these file extensions are surely not the only options.

In the directory structure information of FIG. 5, "route" denotes the top of the hierarchical structure, and denotes the device itself, e.g., the server $13_1$. The directories under the "root" include a "folder 1", a "folder 2", a "folder 3", and a "still image file 1. jpg".

The directories under the "folder 1" include a "folder 4" and an "audio file 1. mp3". The directories under the "folder 4" include a "moving image file 1. mpg", a "still image file 2. jpg", and a "still image file 3. jpg".

The "folder 2" under the "root" includes a "moving image file 2. mpg" and a "still image file 4. jpg". The "folder 3" includes an "audio file 2. mp3".

As such, in the server $13_1$, the files of contents and the folders storing the files are accumulated in the hierarchical structure.

As described above, the folders are each provided with an attribute(s) of the file(s), i.e., contents, located thereunder, i.e., file attribute information. That is, for example, located under the "root" are the still image files 1 to 4, the moving image files 1 and 2, and the audio files 1 and 2. As such, the "root" is provided with the file attribute information of p, v, and m because the files of still images, moving images, and audio are located thereunder. In other words, the file attribute information of the "root" is the one provided to the server $13_1$ as is about every file recorded in the server $13_1$.

Similarly, located under the "folder 1" are the audio file 1, the moving image file 1, and the still image files 2 and 3. As such, the "folder 1" is provided with the file attribute information of p, v, and m because the files of still images, moving images, and audio are located thereunder. Further, located under the "folder 4" are the moving image file 1, and the still image files 2 and 3. As such, the "folder 4" is provided with the file attribute information of p and v because the files of still images and moving images are located thereunder.

Still further, located under the "folder 2" are the moving image file 2 and the still image file 4. As such, the "folder 2" is provided with the file attribute information of p and v because the files of still images and moving images are located thereunder. Still further, located under the "folder 3" is the audio file 2 so that the "folder 3" is provided with the file attribute information of m.

As such, the "root" and the "folders" are each provided with the file attribute information of p, v, or m. The recording section 118 in the server $13_1$ is recorded with the folders and the files in the hierarchical structure corresponding to the directory structure information of FIG. 5, for example.

Described next is a display process by the control section 51 by referring to the flowchart of FIG. 6.

Figure 6:
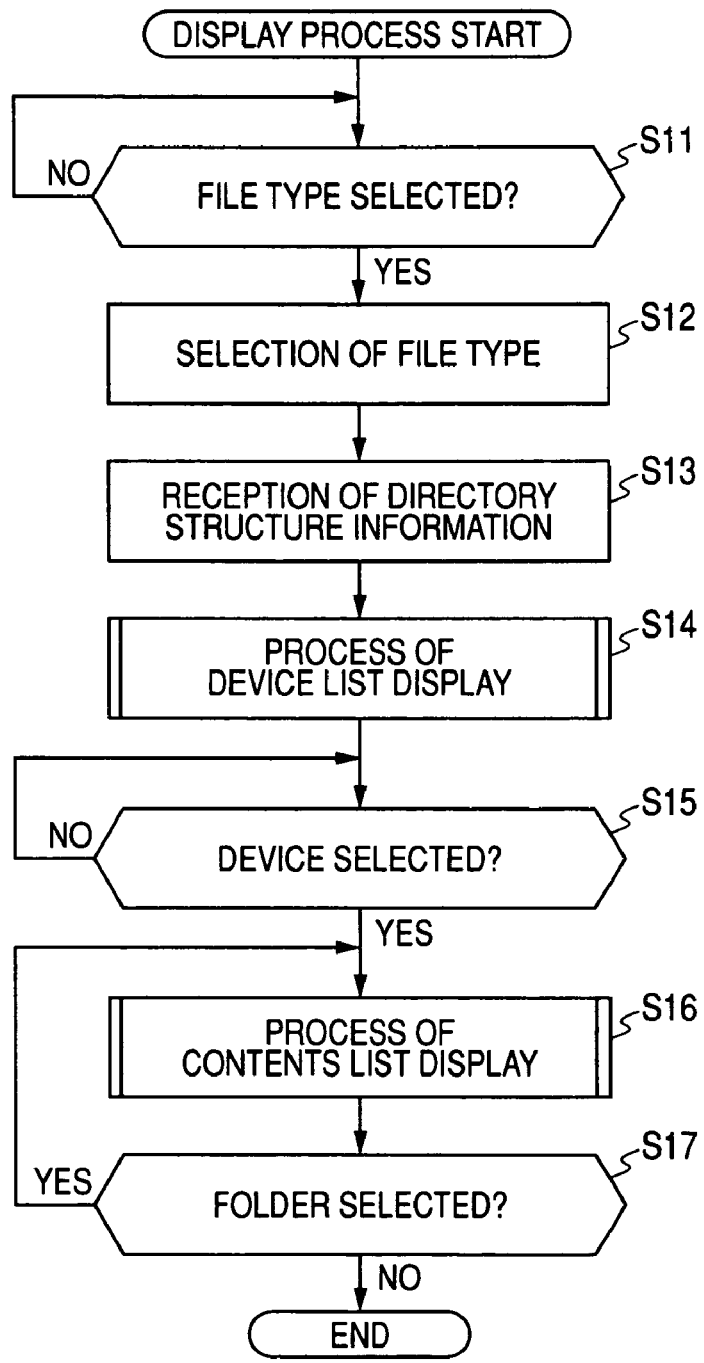
FIG. 6 is a flowchart for illustrating a display process.

The control section 51 executes the process of the flowchart of FIG. 6 when a user designates any predetermined operation via the remote controller 14, and when any predetermined operation command comes from the light reception section 29.

In step S11, the control section 51 determines whether any file type is selected. This determination is made based on the operation command coming from the remote controller 14 via the light reception section 29.

When the determination result of step S11 tells that no file type is yet selected, the procedure returns to step S11, and the determination process is repeated until any file type is selected.

On the other hand, when the determination result of step S11 tells that some file type is selected, the procedure goes to step S12. In step S12, the type selection section 61 selects the file type based on the operation command provided by the light reception section 29.

That is, the type selection section 61 selects any file type corresponding to an icon designated by the user-operating remote controller 14. Such a file type selection is made from icons 211a to 211c on a file type selection screen 201 of FIG. 7 displayed on the display section 26.

Figure 7:
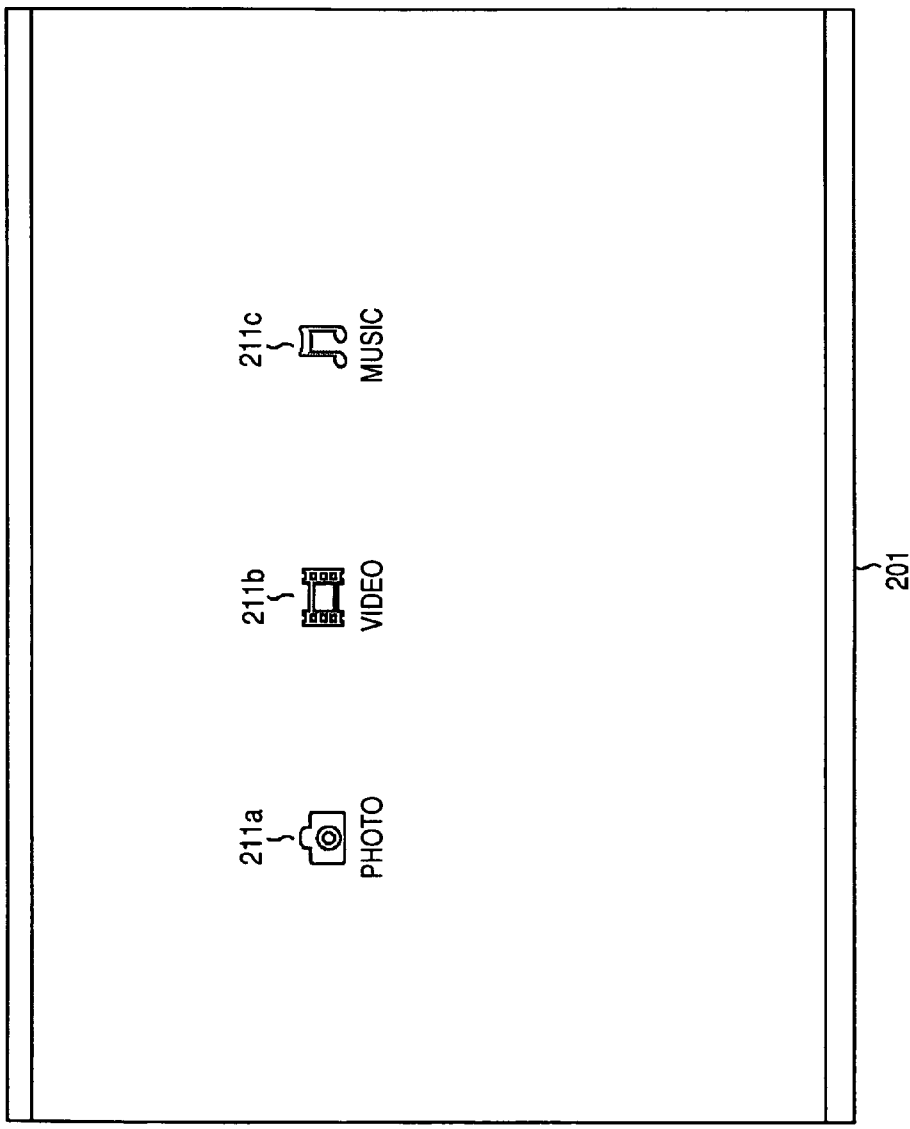
FIG. 7 is a schematic diagram showing an exemplary configuration of a file type selection screen.

In the file type selection screen 201 of FIG. 7, the icon 211a is for directing list display of contents of still images, the icon 211b is for directing list display of contents of moving images, and the icon 211c is for directing list display of contents of audio. That is, the user selects any of the icons 211a to 211c through operation of the remote controller 14, thereby making the display section 26 to display thereon a list of devices to which the contents of the file type corresponding to the selected icon are stored.

In this example, assuming that the icon 211a is selected from the icons 211a to 211c on the file type selection screen 201 of FIG. 7, the type selection section 61 selects the file type of still images.

Referring back to the flowchart of FIG. 6, in step S13, the reception control section 62 controls the communications section 28, thereby receiving directory structure information from devices connected over the network 12, e.g., the servers $13_1$ to $13_n$.

To be specific, for example, the reception control section 62 forwards a request such as contents request or others to devices connected over the network 12 through control over the communications section 28, thereby receiving the directory structure information of FIG. 5 from the server $13_1$ over the network 12. As such, the television receiver 11 can acquire information about the contents stored in the server $13_1$ based on the directory structure information of FIG. 5.

Note that the directory structure information of FIG. 5 is an example of information stored in the device connected over the network 12, indicating the hierarchical structure of files and folders. This is surely not restrictive, and the directory structure information may indicate the hierarchical structure of any other files and folders.

In step S14, based on the received directory structure information, the attribute determination section 63 and the display control section 64 go through a device list display process of displaying a list of only devices to which the contents of the selected type are stored.

By referring to the flowchart of FIG. 8, described in detail is the device list display process executed by the attribute determination section 63 and the display control section 64. This process is corresponding to the process of step S14.

In step S31, the attribute determination section 63 determines whether any target device connected over the network 12, e.g., the server $13_1$ to $13_n$, is provided with information about the attribute/type of files included in the target device, i.e., file attribute information. This determination is made based on the file attribute information of the "root" in the directory structure information provided by the reception control section 62, for example.

When the determination result in step S31 tells that the target device is provided with no such information about the file attribute/type included in the target device, the procedure goes to step S34. In step S34, the display control section 64 displays the target device on the display section 26.

That is, in this case, although there is no clue about the file type of the contents stored in the target device because there is no file attribute information provided thereto, there remains a possibility that the target device to which any contents of the selected type are stored. The display control section 64 thus displays the icon corresponding to the target device on the display section 26, for example.

On the other hand, when the determination result in step S31 tells that the target device is provided with the information about the file attribute/type included in the target device, the procedure goes to step S32. In step S32, the attribute determination section 63 determines whether the target device is recorded with any files of the selected type. This determination is made based on the file attribute information provided to the target device, i.e., for example, file attribute information about the "root" in the directory structure information.

When the determination result in step S32 tells that the files of the selected type are recorded, the procedure goes to step S34. In step S34, the display control section 64 displays the target device on the display section 26.

That is, in this case, because the target device is recorded with the contents of the user-selected type, the display control section 64 displays the icon corresponding to the target device on the display section 26.

On the other hand, when the determination result in step S32 tells that the files of the selected type are not recorded, the procedure goes to step S33. In step S33, the display control section 64 does not display the target device on the display section 26.

That is, in this case, because the contents of the type selected by the user are not stored in the target device, i.e., only the contents not wanted by the user are stored in the target device, the display control section 64 controls not to display the icon corresponding to the target device on the display section 26.

In step S35, the attribute determination section 63 determines whether the devices connected over the network 12, e.g., the servers $13_1$ to $13_n$, are all through with the display determination process.

When the determination result in step S35 tells that not every device is yet through with the display determination process, the procedure returns to step S31 to repeat the processes of steps S31 to S35 described above until every device connected over the network 12 is through with the display determination process.

That is, in the processes of steps S31 to S35, a process of display control over the target device is executed based on the result of the determination process executed by the attribute determination section 63, and based on the determination result of the determination process executed by the display control section 64. As a result, when the icon 211a is selected from the icons 211a to 211c on the file type selection screen 201 of FIG. 7, the display control section 64 displays a device list screen 221 of FIG. 9 on the display section 26. The device list screen 221 is a list of device(s) recorded with contents of still images.

The device list screen 221 of FIG. 9 displays therein icons 231a and 231b below the icon 211a selected by the user. The icon 231a is the one corresponding to the server $13_1$, and the icon 231b is the one corresponding to the server $13_3$. The servers $13_1$ and $13_3$ are both recorded with the contents of still images requested by the selected icon 211a. That is, in this case, among the servers $13_1$ to $13_n$ connected over the network 12, the servers $13_1$ and $13_3$ are recorded with the contents of still images, and the remaining servers, i.e., the servers $13_2$, and $13_4$ to $13_n$, are not recorded with the contents of still images.

Figure 9:
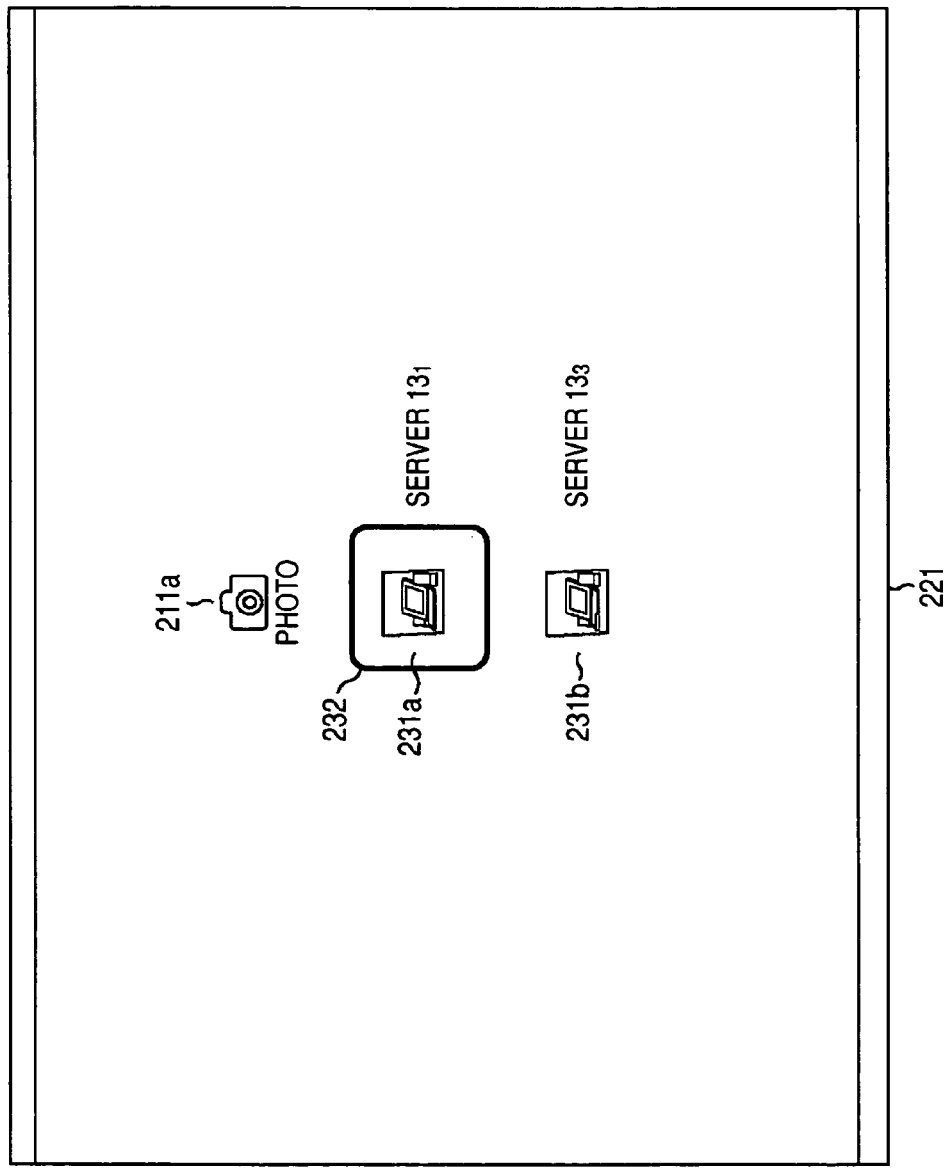
FIG. 9 is a schematic diagram showing an exemplary configuration of a device list screen.

As such, the device list screen 221 of FIG. 9 displays thereon only devices recorded with contents of still images selected by the user, thereby preventing any erroneous search of devices not recorded with contents of still images.

This accordingly enables to reduce the number of steps required to reproduce any target contents. Moreover, a device list is displayed after filtering, thereby favorably increasing ease of use of the remote controller 14 of the television receiver 11 that is not good at any complicated operation.

Referring back to the flowchart of FIG. 8, when the determination result in step S35 tells that every device is through with the display determination process, the procedure returns to step S14 of FIG. 6 for process execution after step S14.

In step S15, the control section 51 determines whether a cursor 232 is used for selection of devices corresponding to the icons in the device list screen 221 of FIG. 9, e.g., the server $13_1$ corresponding to the icon 231a and the server $13_3$ corresponding to the icon 231b. This determination is made based on the operation command coming from the remote controller 14 via the light reception section 29.

When the determination result in step S15 tells that no such device selection is made, the procedure returns to step S15 to repeat the determination process until selection of devices corresponding to the icons in the device list screen 221 of FIG. 9 is completed, e.g., the server $13_1$ corresponding to the icon 231a and the server $13_3$ corresponding to the icon 231b.

On the other hand, when the determination result in step S15 tells that device selection is through, the procedure goes to step S16. In step S16, the attribute determination section 63 and the display control section 64 go through a process of contents list display based on the received directory structure information. This contents list display process is of displaying files of the selected type and folders storing the files on a hierarchy basis.

By referring to the flowchart of FIG. 10, described next are the details of the contents list display process to be executed by the attribute determination section 63 and the display control section 64. This process corresponds to the process of step S16.

In step S51, the attribute determination section 63 determines whether a display target is a file or not. This determination is made based on the directory structure information provided by the reception control section 62.

When the determination result in step S51 determines that the display target is not a file, i.e., the display target is a folder, the procedure goes to step S52. In step S52, the attribute determination section 63 determines whether the folder being the display target is provided with information about the attribute of a file(s) found in the folder, i.e., file attribute information. This determination is made based on the directory structure information.

When the determination result in step S52 tells that the folder is provided with no such information about the attribute of a file(s) found in the folder, the procedure goes to step S56. In step S56, the display control section 64 displays the folder being the display target on the display section 26.

That is, in this case, although there is no clue about the file type of the contents stored in the folder, there remains a possibility that the folder includes therein any contents of the selected type. The display control section 64 thus displays the icon corresponding to the folder on the display section 26, thereby ensuring the accessibility to the minimum number of files.

On the other hand, when the determination result in step S52 tells that the folder is provided with the information about the attribute of a file(s) included in the folder, the procedure goes to step S53. In step S53, the attribute determination section 63 determines whether the folder being the display target is provided with any information about the attribute of the file(s) of the selected type, i.e., file attribute information. This determination is made based on the file attribute information provided to the folder.

When the determination result in step S53 tells that the folder is provided with such information about the attribute of the file(s) of the selected type, the procedure goes to step S56. In step S56, the display control section 64 displays the folder being the display target on the display section 26.

That is, in this case, because therein the contents of the type selected by the user are stored in the folder, the display control section 64 displays an icon corresponding to the folder on the display section 26.

On the other hand, when the determination result in step S53 tells that the folder is provided with no such attribute information of the file(s) of the selected type, the procedure goes to step S54. In step S54, the display control section 64 does not display the folder being the display target on the display section 26.

That is, in this case, because the contents of the type selected by the user not stored in the folder, i.e., only the contents not wanted by the user are stored in the folder, the display control section 64 controls not to display the icon corresponding to the folder on the display section 26.

On the other hand, when the determination result in step S51 tells that the display target is a file, the procedure goes to step S55. In step S55, the attribute determination section 63 determines whether the file being the display target is of the selected type or not. This determination is made based on the directory structure information. Note here that, to define the file by type, used as a basis is meta data including any file extension or information about the file type, for example.

When the determination result in step S55 tells that the display target is the file of the selected type, the procedure goes to step S56. In step S56, the display control section 64 displays the file being the display target on the display section 26.

That is, in this case, because the display target is the file of the type selected by the user, the display control section 64 displays an icon corresponding to the file on the display section 26, for example.

On the other hand, when the determination result in step S55 tells that the display target is not the file of the selected type, the procedure goes to step S54. In step S54, the display control section 64 does not display the file being the display target on the display section 26.

That is, in this case, because the display target is not the file of the type selected by the user, the display control section 64 controls not to display an icon corresponding to the file on the display section 26.

In step S57, the attribute determination section 63 determines whether every display target in any same hierarchy is through with the display determination process.

When the determination result in step S57 tells that not every display target in any same hierarchy is yet through with the display determination process, the procedure returns to step S51 to repeat the processes of steps S51 to S57 described above.

Exemplified here is a case where, in the process of step S15 of FIG. 6, the icon 231a is selected from the icons 231a and the icon 231b in the device list screen 221 of FIG. 9. In this case, in the processes of steps S51 to S56, executed are the determination process by the attribute determination section 63, and the display control process to any display target based on the result of the determination process by the display control section 64. As a result, the display section 26 displays thereon a contents list screen 241 of FIG. 11, i.e., list of still image files and folders storing the files in the server $13_1$, for example.

Figure 11:
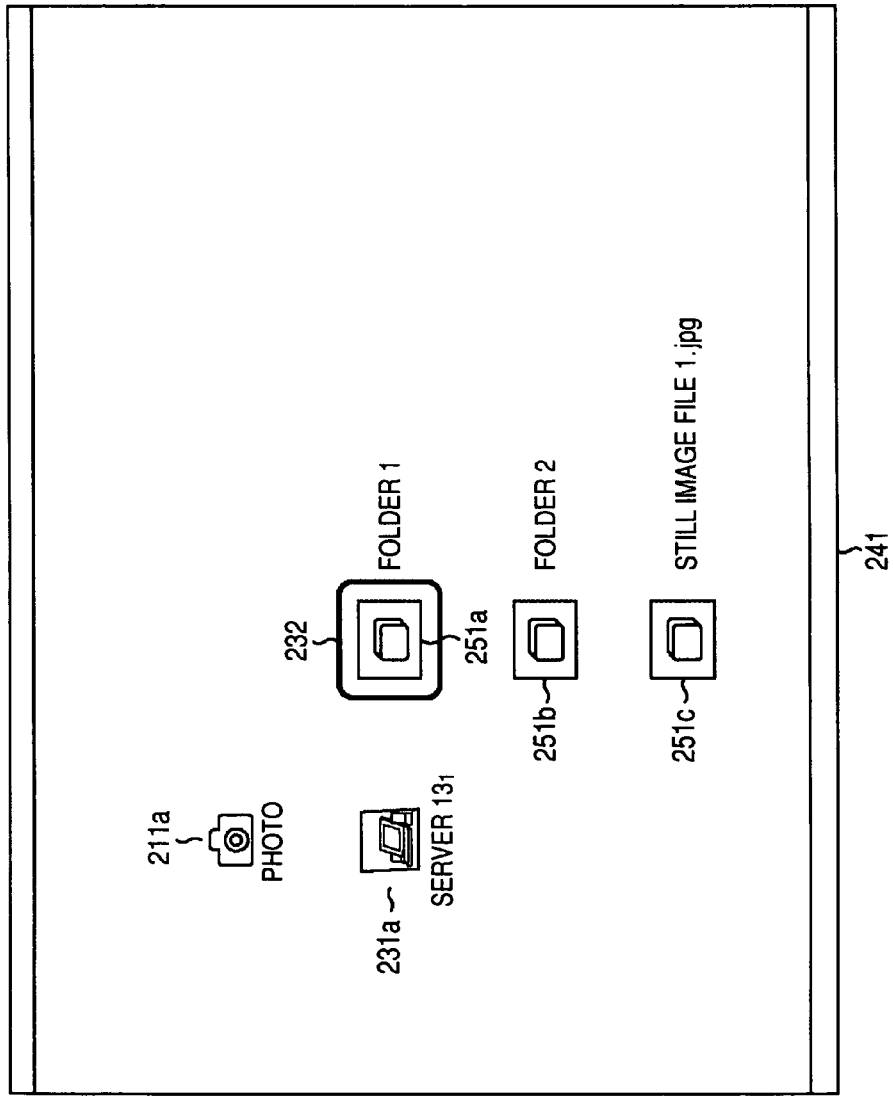
FIG. 11 is a schematic diagram showing an exemplary configuration of a contents list screen.

The contents list screen 241 of FIG. 11 displays therein icons 251a, 251b, and 251c on the right side of the icons 211a and 231a selected sequentially by the user. The icons 251a and 251b are those corresponding to the folders storing files of still images recorded in the server $13_1$ requested by the selected icon 231a, and the icon 251c is the one corresponding to the file of still images.

That is, as indicated by the directory structure information of FIG. 5, the server $13_1$ includes the "folder 1", the "folder 2", the "folder 3", and the "still image file 1. jpg" in the directories under the "root" being the top of the hierarchical structure, i.e., first hierarchy. These folders are provided with file attribute information of p, v, and m, respectively. For example, as described in the foregoing, in the first hierarchy of the server 13₁, the "folder 1" is provided with the file attribute information of p, v, and m, the "folder 2" is provided with the file attribute information of p and v, and the "folder 3" is provided with the file attribute information of m.

That is, in the processes of steps S51 to S56, the display control section 64 displays, on the display section 26, the contents list screen 241 of FIG. 11, including the "folder 1" and the "folder 2" provided with the file attribute information of p, and the icons 251*a* to 251*c* corresponding to "still image file 1. jpg" being the files of still images.

As such, the contents list screen 241 of FIG. 11 displays only files of still images of the type selected by the user and folders storing the files of still images, thereby preventing any erroneous search of folders not storing contents of still images. For example, the contents list screen 241 of FIG. 11 is controlled not to display the "folder 3" storing only files of audio in the first hierarchy of the directory structure information of FIG. 5. This favorably prevents to erroneously find the "finder 3" when a search is being made for files of still images.

Referring back to the flowchart of FIG. 10, when the determination result in step S57 tells that every display target in any same hierarchy, e.g., first hierarchy, is through, the procedure returns to step S16 of FIG. 6 for the processes after step S16.

In step S17, the control section 51 determines whether any folder selection is made based on an operation command coming from the remote controller 14 via the light reception section 29.

When the determination result in step S17 tells that a folder selection is made because the icon 251*a* is selected from the icons 251*a* to 251*c* of the contents list screen 241 of FIG. 11, for example, the procedure returns to step S16. In step S16, the process of the contents list display is executed again by the attribute determination section 63 and the display control section 64.

Figure 12:
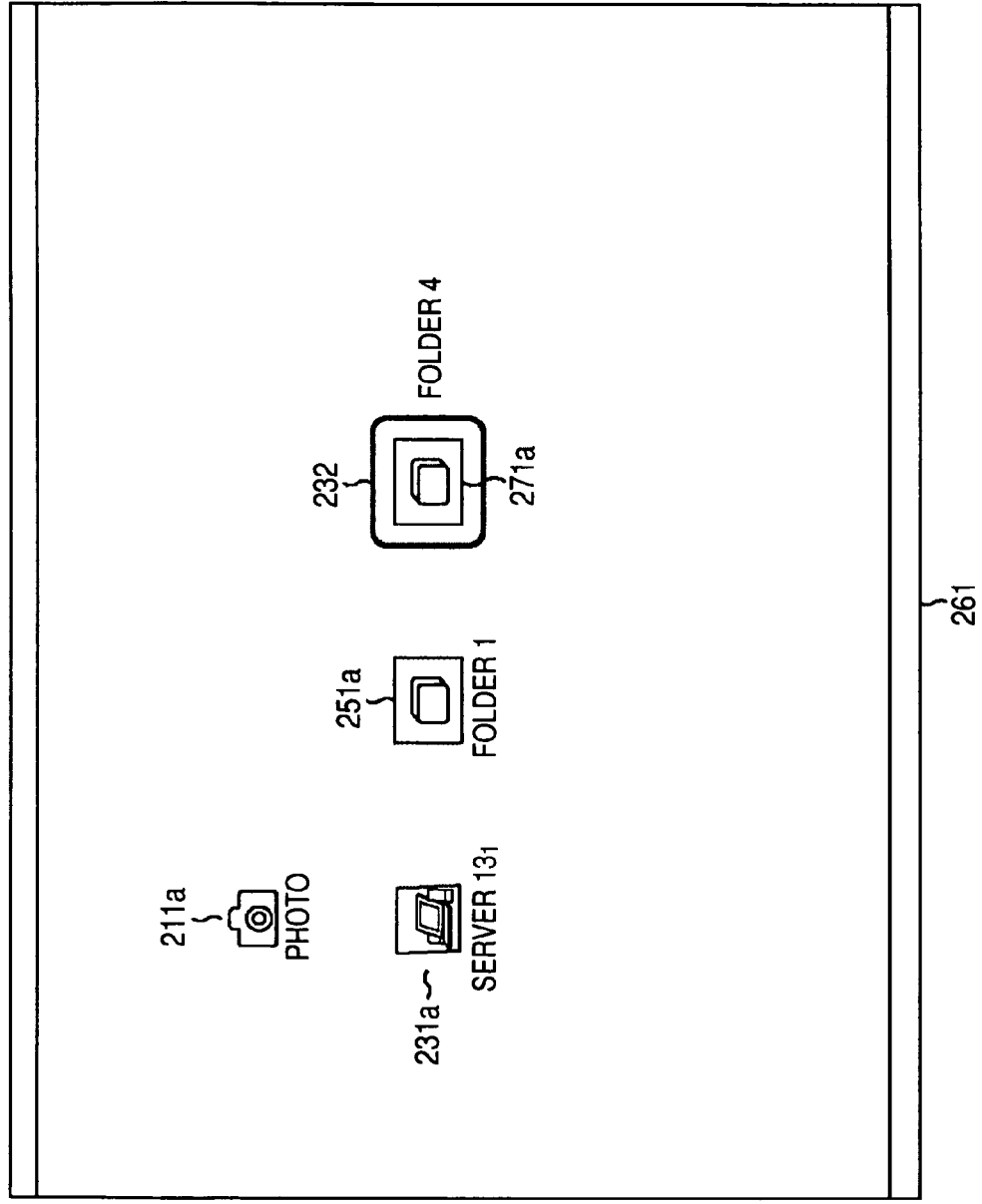
FIG. 12 is a schematic diagram showing another exemplary configuration of a contents list screen.

As a result of the process of step S16 for the second time, i.e., the determination process by the attribute determination section 63, and the display control process to a display target based on the result of the determination process by the display control section 64, the contents list screen 261 of FIG. 12 is displayed, for example.

The contents list screen 261 of FIG. 12 displays therein an icon 271*a* on the right side of the icons 211*a*, 231*a*, and 251*a* selected sequentially by the user. The icon 271*a* is the one corresponding to the folder storing therein files of still images under the "folder 1" requested by the selected icon 251*a*.

That is, as indicated by the directory structure information of FIG. 5, the server 13₁ includes the "folder 4" and the "audio file 1. mp3" in the directories under the "folder 1", i.e., second hierarchy. The "folder 4", is provided with the file attribute information of p and v, as described above.

That is, in the process of step S16 for the second time, the contents list screen 261 of FIG. 12 displayed by the display control section 64 on the display section 26, displayed is only the icon 271*a* corresponding to the "folder 4" provided with the file attribute information of p.

As such, the contents list screen 261 of FIG. 12 is controlled not to display the file of audio, i.e., "audio file 1. mp3", in the second hierarchy of the directory structure information of FIG. 5. This thus favorably prevents from erroneously reproducing the "audio file 1. mp3" during a search of files of still images.

Referring back to the flowchart of FIG. 6, in step S17, the control section 51 determines whether a folder selection is made based on the operation command coming from the remote controller 14 via the light reception section 29.

When the determination result in step S17 tells that a folder selection is made because the icon 271*a* is selected from the contents list screen 261 of FIG. 12 for example, the procedure returns to step S16. In step S16, the process of contents list display is executed again by the attribute determination section 63 and the display control section 64.

Figure 13:
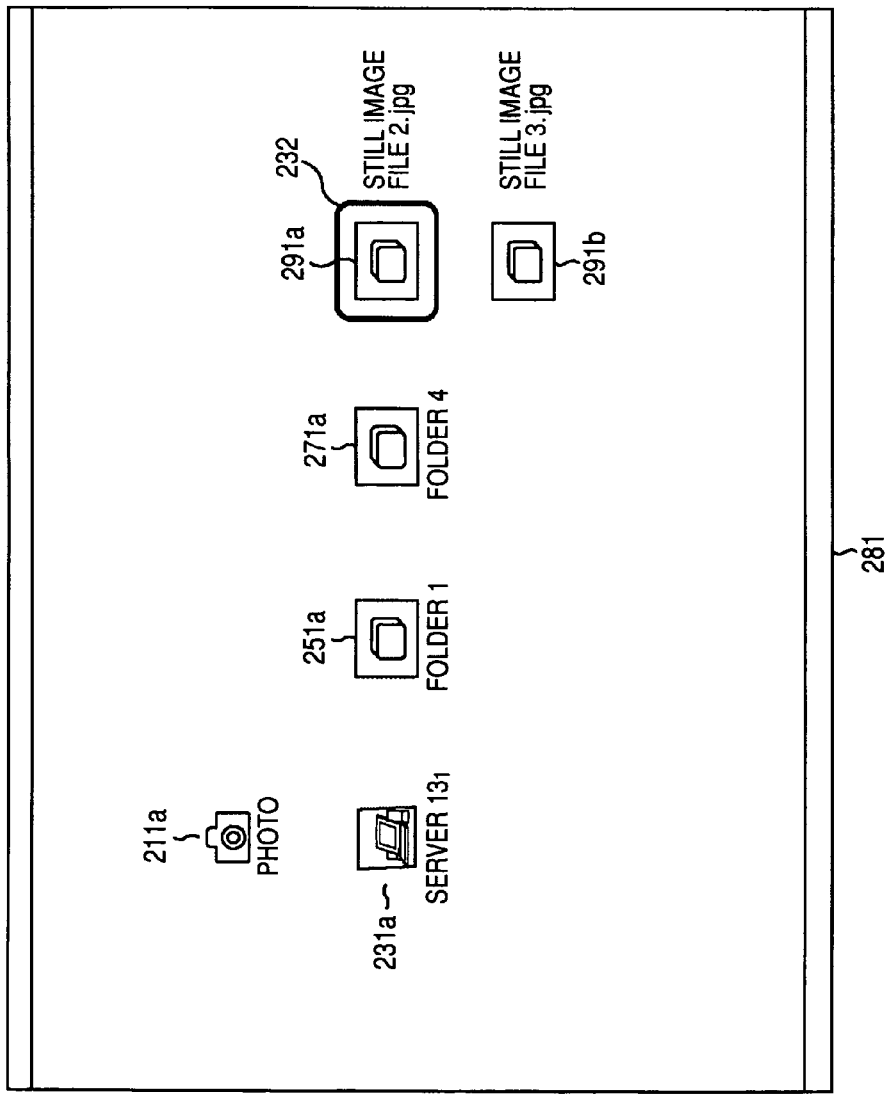
FIG. 13 is a schematic diagram showing still another exemplary configuration of a contents list screen.

As a result of the process of step S16 for the third time, i.e., the determination process by the attribute determination section 63 and the display control process to a display target based on the result of the determination process by the display control section 64, the contents list screen 281 of FIG. 13 is displayed, for example.

The contents list screen 281 of FIG. 13 displays thereon icons 291*a* and 291*b* on the right side of the icons 211*a*, 231*a*, 251*a*, and 271*a* selected sequentially by the user. The icons 291*a* and 291*b* are those corresponding to files of still images under the "folder 4" requested by the selected icon 271*a*.

That is, as indicated by the directory structure information of FIG. 5, the server 13₁ includes the "moving image file 1. mpg", the "still image file 2. jpg", and the "still image file 3. jpg" in the directories, i.e., third hierarchy, under the "folder 4".

As a result of the process of step S16 for the third time, the contents list screen 281 of FIG. 13 displayed by the display control section 64 on the display section 26, displayed are only the icons 291*a* and 291*b* corresponding to, respectively, the "still image file 2. jpg" and the "still image file 3. jpg" both being a file of still images.

As such, the contents list screen 281 of FIG. 13 is controlled not to display the file of moving images, i.e., "moving image file 1. mpg", in the third hierarchy of the directory structure information of FIG. 5. This thus favorably prevents from erroneously reproducing the "moving image file 1. mpg" during a search of files of still images.

Referring back to the flowchart of FIG. 6, when the determination result in step S17 tells that no folder is yet selected, the display process by the control section 51 is ended.

As described above, in the television receiver 11, when a user selects contents of still images, for example, the display of only any "still image files" or any "folders including a still image file (s)" is selectively made. On the other hand, the display of any "files other than still image files", or any "folders not including a still image file(s)" is controlled not to be made.

When selecting contents of still images, the user views only "a still image file(s)" or "a folder(s) including a still image file(s)", i.e., the user views "result of sorting on the basis of file attribute". This accordingly prevents display of folders including files not wanted by a user, thereby favorably increasing the searchability and list display for the contents.

By providing the file attributes to devices such as the server 13 connected over the network 12 and folders, the operability can be increased only by making some change to information displayed on the screen, i.e., no change to the remote controller 14 for operating the television receiver 11.

Further, using only the remote controller 14 that is never high in selectivity and is never good at complicated operation, a user viewing the television receiver 11 can view a contents list that is in advance filtered for any previously-selected type. Accordingly, the number of steps can be reduced before displaying and reproducing any target contents. This favorably increases ease of use of the television receiver 11 using the remote controller 14.

Moreover, when a user makes a search of contents in response to his or her wants such as "want to view still images" or "want to listen to music", the user is protected from to erroneously find any folder not including his or her wanting contents.

Note that exemplified in this embodiment is a contents search of still images. This is surely not restrictive, and any contents of moving images and audio can be similarly processed.

In the process of step S13 of FIG. 6, the description is given that the directory structure information is received from every device connected over the network 12. Alternatively, the directory structure information may be received only from a device(s) selected by a user. If this is the case, in the process of step S13 of FIG. 6, only the file attribute information of the device(s) is received, and based on the received file attribute information of the device, the process of device list display is executed.

Moreover, exemplified above is that, when folders and devices are not provided with the attribute of the selected type, the folders and devices are controlled not to be displayed. Alternatively, for example, every folder and device may be displayed, and among the folders and devices on the display, any folder and device not provided with the attribute of the selected type may be displayed in gray.

In this specification, the steps of the program to be stored in a recording medium include not only processes to be executed in a time series manner in the described order but also to be executed in a parallel manner or separately.

Also in this specification, the system denotes an entire device configured by a plurality of devices.

It should be understood by those skilled in the art that various modifications, combinations, sub-combinations and alterations may occur depending on design requirements and other factors insofar as they are within the scope of the appended claims or the equivalents thereof.

The invention claimed is:

1. A display control device that controls, in response to user's operation to a remote controller, a list display of a file of contents accumulated in another device connected over a network, and a list display of a folder in a hierarchy for storing the file, the display control device comprising:
   type selection means for selecting a type of contents for the file in accordance with the user's operation to the remote controller;
   reception control means for controlling reception of file attribute information coming from the another device about an attribute provided to the folder indicating the type of contents for the file stored in the folder at the another device, the file attribute information provided to the folder being other than information provided to the file to indicate type of contents for the file;
   attribute determination means for determining (i) a determination result indicating whether the another device is provided with information about attribute/type of a file of contents included in the another device from information about contents in the another device received by the reception control means, and (ii) when the determination result is the another device is provided with information about attribute/type of a file of contents included in the another device, based on the file attribute information, whether the another device is recorded with a file of a type of contents same as the selected type and whether the folder is provided with the attribute of the selected type; and
   display control means for controlling, when the folder is determined as not being provided with the attribute of the selected type, the list display to cause the folder to be displayed in a predetermined color.

2. The display control device according to claim 1, wherein
   the attribute determination means determines whether the type of contents for the file is the same as the selected type, and
   the display control means controls, when the type of contents for the file is determined as not being the same as the selected type, the list display to cause the file to be displayed in the predetermined color.

3. The display control device according to claim 1, wherein
   when the another device is determined as not being recorded with the file of the type of contents same as the selected type, the display control means controls a list display of devices to constrain a display of the another device.

4. The display control device according to claim 1, wherein
   the contents are a file of a still image, a moving image, or audio.

5. The display control device according to claim 1, wherein
   the another device is compatible to specifications of DLNA (Digital Living Network Alliance).

6. A display control method for a display control device that controls, in response to user's operation to a remote controller, a list display of a file of contents accumulated in another device connected over a network, and a list display of a folder in a hierarchy for storing the file, the display control method comprising:
   selecting a type of contents for the file in accordance with the user's operation to the remote controller;
   controlling reception of file attribute information coming from the another device about an attribute provided to the folder indicating the type of contents for the file at the another device, the file attribute information provided to the folder being other than information provided to the file to indicate type of contents for the file;
   determining a determination result indicating whether the another device is provided with information about attribute/type of a file of contents included in the another device from information about contents in the another device that is received, wherein the determining includes, when the determination result is the another device is provided with information about attribute/type of a file of contents included in the another device, determining, based on the file attribute information, whether the another device is recorded with a file of a type of contents same as the selected type and whether the folder is provided with the attribute of the selected type; and
   controlling, when the folder is determined as not being provided with the attribute of the selected type, the list display to cause the folder to be displayed in a predetermined color.

7. A non-transitory computer readable recording medium having stored thereon a program allowing a computer to execute a process of controlling, in response to user's operation to a remote controller, a list display of a file of contents accumulated in another device connected over a network, and a list display of a folder in a hierarchy for storing the file, the display control process comprising:
   selecting a type of contents for the file in accordance with the user's operation to the remote controller;
   controlling reception of file attribute information coming from the another device about an attribute provided to the folder indicating the type of contents for the file stored in the folder at the another device, the file attribute information provided to the folder being other than information provided to the file to indicate type of contents for the file;

determining a determination result indicating whether the another device is provided with information about attribute/type of a file of contents included in the another device from information about contents in the another device that is received, wherein the determining includes, when the determination result is the another device is provided with information about attribute/type of a file of contents included in the another device, determining, based on the file attribute information, whether the another device is recorded with a file of a type of contents same as the selected type and whether the folder is provided with the attribute of the selected type; and controlling, when the folder is determined as not being provided with the attribute of the selected type, the list display to cause the folder to be displayed in a predetermined color.

8. A display control device that controls, in response to user's operation to a remote controller, a list display of a file of contents accumulated in another device connected over a network, and a list display of a folder in a hierarchy for storing the file, the display control device comprising:

a type selection unit configured to select a type of contents for the file in accordance with the user's operation to the remote controller;

a reception control unit configured to control reception of file attribute information coming from the another device about an attribute provided to the folder indicating the type of contents for the file stored in the folder at the another device, the file attribute information provided to the folder being other than information provided to the file to indicate type of contents for the file;

an attribute determination unit configured to determine (i) a determination result indicating whether the another device is provided with information about attribute/type of a file of contents included in the another device from information about contents in the another device received by the reception control unit, and (ii) when the determination result is the another device is provided with information about attribute/type of a file of contents included in the another device, based on the file attribute information, whether the another device is recorded with a file of a type of contents same as the selected type and whether the folder is provided with the attribute of the selected type; and a display control unit configured to control, when the folder is determined as not being provided with the attribute of the selected type, the list display to cause the folder to be displayed in a predetermined color.

9. The display control device according to claim 1, wherein the predetermined color is grey.

10. The display control method according to claim 6, wherein the predetermined color is grey.

11. The medium according to claim 7, wherein the predetermined color is grey.

12. The display control device according to claim 8, wherein the predetermined color is grey.

* * * * *